United States Patent [19]
Grenda et al.

[11] 3,873,558
[45] Mar. 25, 1975

[54] PROCESS FOR PREPARING 1,5-SUBSTITUTED OR 1,6-SUBSTITUTED BENZIMIDAZOLES

[75] Inventors: Victor J. Grenda, Warren; Robert F. Czaja, Elizabeth, both of N.J.

[73] Assignee: Merck & Co., Inc., Rahway, N.J.

[22] Filed: Nov. 10, 1970

[21] Appl. No.: 88,493

Related U.S. Application Data

[63] Continuation-in-part of Ser. No. 16,956, March 5, 1970, abandoned.

[52] U.S. Cl....... 260/302 H, 260/302 R, 260/309.2, 260/463, 260/570.5 P, 260/999
[51] Int. Cl............................................ C07d 99/10
[58] Field of Search................................ 260/302 H

[56] References Cited
UNITED STATES PATENTS
3,265,706   8/1966   Gal et al. ........................ 260/302 H OTHER PUBLICATIONS
Wagner et al., Synthetic Organic Chemistry, John Wiley & Sons, N.Y., 1953, pp. 646–647.

*Primary Examiner*—Richard J. Gallagher
*Attorney, Agent, or Firm*—David L. Rose; Frank M. Mahon; J. Jerome Behan

[57] ABSTRACT

A process for preparing 1-hydroxy-5-(or 6)-carbonylamino(or thiocarbonylamino)-2-(4'-thiazolyl)-benzimidazoles by reacting a 3-(or 4-)halo-4-(or 3)-nitroaniline (a) with an aminomethylthiazole to prepare an N-(thiazolylmethyl)-2-nitro-3-(or 4-)nitroaniline; (b) reacting the latter compound with a loweralkylchloroformate or an acid halide in an organic solvent to prepare an N-(triazolylmethyl)-2-nitro-3-(or 4-)carbonylamino-aniline; (c) and cyclizing the latter product by treating with a strong base in a solvent to the end benzimidazole.

4 Claims, No Drawings

PROCESS FOR PREPARING 1,5-SUBSTITUTED OR 1,6-SUBSTITUTED BENZIMIDAZOLES

This application is a continuation-in-part application of United States Ser. No. 16,956, filed Mar. 5, 1970, now abandoned.

ABSTRACT OF THE INVENTION

A process for preparing 1-hydroxy-5-(or 6)carbonylamino (or thiocarbonylamino)-2-(4'-thiazolyl)-benzimidazoles by reacting a 3-(or 4-) halo-4-(or 3-)nitroaniline (a) with an aminomethylthiazole to prepare an N-(thiazolylmethyl)-2-nitro-3-(or 4-)nitroaniline; (b) reacting the latter compound with a loweralkylchloroformate or an acid halide in an organic solvent to prepare an N-(thiazolylmethyl)-2-nitro-3-(or 4-) carbonylamino-aniline; (c) and cyclizing the latter product by treating with a strong base in a solvent to the end benzimidazole.

This invention relates to a process for preparing 1-hydroxy-5-(or 6-)-carbonylamino (or thiocarbonylamino) 2-(4'-thiazolyl)-benzimidazole having the following formula:

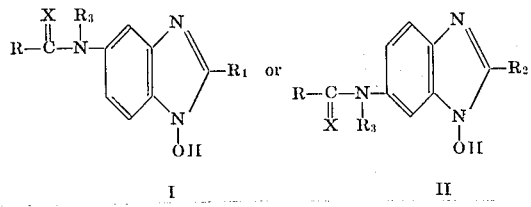

wherein R is loweralkoxy, loweralkylthio, aryl, aryloxy, arylthio, heteroaryloxy, or heteroarylthio; and $R_1$ is a five-membered monocyclic heteroaromatic ring containing from 1 to 3 hetero atoms selected from the group consisting of oxygen, sulfur, or nitrogen; $R_3$ is hydrogen or straight or branched chain alkyl containing 1 to 8 carbon atoms; and X is oxygen or sulfur.

Preferably, in the above formulas, R is loweralkoxy having 1 to 8 carbon atoms, phenyl, or p-fluorophenyl; $R_1$ is thiazolyl; $R_3$ is hydrogen; and X is oxygen.

The compounds of Formula I, (the "1–5" isomers) have been described in the literature, see, for instance, in Belgian Pat. No. 710,081, issued July 30, 1968. A process is described in that patent which gives a mixer of isomers. It is, therefore, a purpose of this invention to provide a process for preparing both the 1–5 and 1–6 isomers thus yielding the desired isomer without production of the other isomer.

The compounds of this invention are used to treat helminthiasis in the form of orally administerable drenches, boluses, capsules, or in animal feeds. They may also be administered to the infected host via intramuscular, intraruminal, or intratracheal injection. In addition to their high degree of anthelmintic activity the novel benzimidazoles of this invention also possess significant antifungal activity, and they are also active against trichinosis. The 1-hydroxy compounds prepared in this invention can also be used to prepare a number of 1-ester and 1-ether benzimidazoles which also possess ability as antihelmintics and antifungal agents.

In summary, the process of this invention comprises using the following compounds as starting materials:

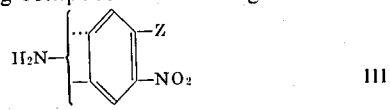

wherein Z is a halo group, preferably chloro, or fluoro, operably also bromo and iodo. The dotted line indicates that -$NH_2$ can be located in either position, but not both. Where the starting material has -$NH_2$ located in the dotted position, the 1,5-benzimidazole is formed; when -$NH_2$ is located in the solid line position, the 1,6-benzimidazole is formed.

The nitro-haloaniline described in Formula III is first reacted with an aminomethyl-heterocyclic compound: $NH_2CH_2$-$R_1$, wherein $R_1$ is as defined above. This condensation reaction takes place by heating together the two reactants on a steam bath, or other means. The compound thereby formed is a N-(substituted methyl)-aniline having the following formula:

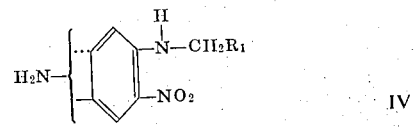

-$NH_2$ being unchanged during the condensation reaction. At this point the carbonylamino or thiocarbonylamino group is substituted onto the ring. One method of accomplishing this substitution is by reacting the N-(substituted methyl)-aniline (IV) with an R-haloformate or halothioformate where R is the hydrocarbonoxy moiety defined above. When R is aryl or p-fluoroaryl, the appropriate acid halide is used. When an R-haloformate is employed as a reactant, the resultant substituent at the 5-position or the 6-position of the benzimidazole will have the characteristic structure, R—O—CO—NH—. When an acid halide is the reactant, the structure,

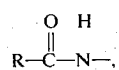

is produced. For convenience, such substituents may be referred to generically as hydrocarbonoxy-carbonylamino or hydrocarboncarbonylamino radicals, respectively. When an R-halothioformate is employed as a reactant, the resultant substituent at the 5-position will have the characteristic structure, R—S—CO—NH—. For convenience, these substituents may be referred to generically as hydrocarbonthio-carbonylamino radicals.

The above reaction is preferably carried out using the appropriate chloroformate or chlorothioformate. It is conveniently conducted at temperatures of from about −40° to 50°C. in an organic solvent and in the presence of an acid binding agent. It has been found very convenient to conduct the reaction in a solvent such as pyridine which also serves as acid binding agent, although other basic solvents such as the picolines and lutidines could be used equally well. Neutral solvents, however, can be employed in which case the product is isolated as the acid addition salt. The resulting product is water insoluble and is conveniently precipitated by diluting the reaction mixture with a relatively large volume of water. The solid is then recovered by standard methods and purified by recrystallization from solvents such as methanol, ethanol, acetonitrile or mixtures thereof. When a loweralkanol is used as the recrystallization solvent, there is a tendency on the part of some of our compounds, especially those wherein the radical R is of lower molecular weight, to crystallize as an alcohol solvate. When this occurs, the free compound may be obtained by drying the solvate under vacuum at temperatures of from about 60°–90°C.

Once the carbonylamino or the thiocarbonylamino group is substituted onto the ring, the intermediate compound:

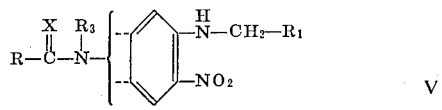

is produced. Compound V can then be treated with a strong base in a suitable solvent to obtain the desired compound I or II. Bases found useful in this process are strong bases such as alkali metal hydroxides, for example, lithium hydroxide, sodium hydroxide, and potassium hydroxide, alkali metal lower alkoxides such as sodium methoxide, and quaternary bases such as benzyl trimethyl ammonium hydroxide, trimethyl allyl ammonium hydroxide, carboxymethyl triethyl ammonium hydroxide and tetraloweralkyl ammonium hydroxides such as tetramethyl ammonium hydroxide, tetraethyl ammonium hydroxide, tetrapropyl ammonium hydroxide, tetraisobutyl ammonium hydroxide, and the like. The process is run in a solvent capable of dissolving the base. Solvents such as water, lower-alkanols for example methanol, ethanol, propanol, isopropanol and the like, aqueous dioxane and polyols such as glycol are examples of some of the solvents which may be used.

It is preferred that at least about 1–5 moles of base per mole of compound V be used and a still greater ratio is not detrimental to the reaction.

The reaction is preferably conducted at a temperature of about 50° to about 100°C. and it is more desirable that it be performed at about 60° to about 80°C. However, the reaction temperatures may extend beyond the aforementioned figures and are not critical to the success of the process.

The pH of the resulting solution is then lowered to about 5–6 in order to convert the salt of the 1-hydroxybenzimidazole to the hydroxy form. The product thereby precipitates, is collected by normal means such as by filtration, and is purified by washing and recrystallization. Acids useful for lowering the pH consist of any convenient acid, for example acetic acid, phosphoric acid, sulfuric acid, hydrochloric acid, and the like.

The process of this invention is particularly described in the following Examples.

EXAMPLE 1

5-Isopropoxycarbonylamino-1-Hydroxy-2-(4'-Thiazolyl)-Benzimidazole 204 g. of m-chloroaniline is added dropwise over 30 minutes to 196 g. of acetic anhydride in a 2 L. flask. The temperature of the reaction is maintained at 30°C. throughout the addition. 200 ml. of glacial acetic acid is then added, and the mixture is cooled to 5°C. 490 ml. of concentrated sulfuric acid is then added slowly. The temperature is not permitted to exceed 25°C., and is finally cooled to 10°C. 98 ml. of fuming nitric acid (sp. gr. 1.5) is then added over 80 minutes at 15°C. The reaction mixture is quenched by adding to 6 liters of crushed ice. A solid precipitates. This solid is hydrolyzed in 200 ml. of conc. HCl and 500 ml. of water, by refluxing for 1 hour. 15 ml. of conc. ammonium hydroxide is added to a basic pH. The solid which is precipitated is purified and recrystallized using ethyl alcohol. The final pure product is 3-chloro-4-nitroaniline, m.p. 161.5°–163°C.

19.9 g. of 3-chloro-4-nitroaniline prepared above, 16.6 g. of 4-(aminomethyl)-thiazole, and 23.9 g. of potassium carbonate is stirred under $N_2$ at 125°C. for 3 hours. An additional 3.3 g. of 4-(aminomethyl)-thiazole is then added, and 25 ml. of dimethylformamide is added to the thick reaction mass. The mixture is quenched by adding to 250 ml. of water. When 25 ml. of hexane are added, a brown solid is formed. The product is filtered and purified, and 4-[N-(2-nitro-5-aminophenyl)aminomethyl]-thiazole, m.p. 165°–166°C., is recovered.

8.1 ml. of isopropylchloroformate is added to a cooled slurry of 4-[N-(2-nitro-5-aminophenyl)aminomethyl]-thiazole in 90 ml. of pyridine. The temperature is maintained at 5–10°C. After warming to room temperature and stirring for 45 minutes, an additional 0.5 ml. of isopropylchloroformate is added to complete the reaction. The reaction mixture is then added to 1,800 ml. of ice water to quench. A gum precipitates, which is filtered and purified. The product obtained is 4-[N-(2-nitro-5-isopropoxycarbonylaminophenyl)aminomethyl]thiazole, m.p. 127°–129°C.

A mixture of 18 g. of 4-[N-(2-nitro-5-isopropoxycarbonylaminophenyl)aminomethyl]-thiazole and 14 g. of solid NaOH in 720 ml. of isopropanol is stirred at 45°C. under $N_2$ for 5 hours. A sodium salt of the product starts to precipitate during the first hour of reaction. The product isolated by filtration is dissolved in water. The solution is filtered and acidified in the glacial acetic acid to pH 5. The precipitated product is purified by recrystallization, washed and dried. The product, 5-isopropoxycarbonylamino-1-hydroxy-2-(4-thiazolyl)-benzimidazole, m.p. 233°–234°C., dec., is obtained.

EXAMPLE 2

6-Isopropoxycarbonylamino-1-Hydroxy-2-(4'-Thiazolyl)-Benzimidazole 15.6 g. of 3-nitro-4-fluoroaniline is reacted with 15.8 g. of isopropylchloroformate in pyridine following the procedure in Example 1. The product formed is 3-nitro-4-fluoro-N-(isopropoxycarbonyl)aniline, and is employed in the next step without further purification.

The product is then heated in an ethanoltriethylamine solution with 0.4 g. of 4-(aminomethyl)-thiazole. The reaction is quenched after 15 hours by distilling off the ethanol, causing precipitation of a red solid, which is not further characterized.

The product obtained above is added to a suspension of 470 ml. of conc. NaOH in 10 ml. of isopropanol and heated on a steam bath. The solution is filtered after 25 minutes, and the filtrate evaporated to dryness. The residue is dissolved in a minimum amount of water and acidified with acetic acid. The precipitate which results is washed and purified. The product is identified as 6-isopropoxycarbonylamino-1-hydroxy-2-(4'-thiazolyl)benzimidazole, m.p. 178°–181°C.

EXAMPLE 3

5-Isopropoxycarbonylamino-1-Hydroxy-2-(4'-Thiazolyl)-Benzimidazole

Using the compound 3-bromo-4-nitroaniline instead of the 3-chloro-4-nitroaniline in Example 1, and following the general process of Example 1, the final product, 5-isopropoxycarbonylamino-1-hydroxy-2-(4'-thiazolyl)benzimidazole, m.p. 234°–235°C. is prepared.

EXAMPLE 4

6-Ethoxycarbonylamino-1-Hydroxy-2-(4'-Thiazolyl)-Benzimidazole

Using the compound 4-bromo-3-nitroaniline instead of 3-nitro-4-fluoroaniline, and ethylchloroformate instead of isopropylchloroformate in the process of Example 2, the product 6-ethoxycarbonylamino-(1-hydroxy)-2-(4'-thiazolyl)benzimidazole, m.p. 140°–145°C., dec., is prepared.

EXAMPLE 5

6-Methoxycarbonylamino-1-Hydroxy-2-(4'-Thiazolyl)-Benzimidazole

Using the compound 4-chloro-3-nitroaniline instead of 3-nitro-4-fluoroaniline, and methylchloroformate instead of isopropyl chloroformate in the process of Example 2, the product, 6-methoxycarbonylamino-1-hydroxy-2-(4'-thiazolyl)benzimidazole, m.p. 190°C., dec., is prepared.

EXAMPLE 6

6-Benzamido-1-Hydroxy-2-(4'-Thiazolyl)-Benzimidazole

Using the compound 4-bromo-3-nitroaniline instead of 3-nitro-4-fluoroaniline, and benzoylchloride instead of isopropylchloroformate in the process of Example 2, the product, 6-benzamido-1-hydroxy-2-(4'-thiazolyl)-benzimidazole, m.p. 260°dec., is prepared.

The compound 6-(p-fluorobenzamido)-1-hydroxy-2-(4'-thiazolyl)-benzimidazole is prepared as above, using p-fluorobenzoylchloride as the reactant.

What is claimed is:
1. The process of preparing a 1-hydroxy-5-(or 6-) substituted benzimidazole, having the formula

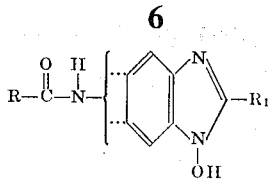

wherein R is lower alkoxy, phenyl, and p-fluorophenyl; and $R_1$ is a thiazolyl radical, which comprises (a) heating a nitrohaloaniline having the formula

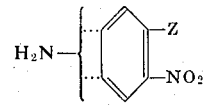

wherein Z is a halo group with an aminomethylthiazole of the formula $$NH_2-CH_2-R_1$$

to prepare an N-(thiazolylmethyl)-aniline having the formula

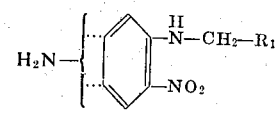

(b) reacting one latter compound with a member selected from the group consisting of a loweralkylhaloformate, a benzoyl halide and a p-fluorobenzoyl halide in an organic solvent in the presence of an acid binding agent to prepare a compound of the formula

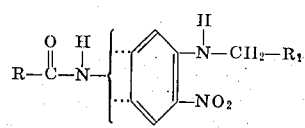

(c) and treating the latter compound with a strong base in a solvent to cyclize to the desired product;
the dotted lines in all the above formulas representing that the substituent is either on the 5-position or the 6-position of the final benzimidazole.
2. The process of claim 1 wherein R is isopropoxy.
3. The process of claim 1 wherein R is ethoxy.
4. The process of claim 1 wherein R is methoxy.

* * * * *